United States Patent
Yoshida et al.

(10) Patent No.: US 10,102,631 B2
(45) Date of Patent: Oct. 16, 2018

(54) EDGE DETECTION BIAS CORRECTION VALUE CALCULATION METHOD, EDGE DETECTION BIAS CORRECTION METHOD, AND EDGE DETECTION BIAS CORRECTING PROGRAM

(71) Applicant: MITUTOYO CORPORATION, Kanagawa (JP)

(72) Inventors: Hiroyuki Yoshida, Kawasaki (JP); Akira Takada, Yokohama (JP); Makoto Kaieda, Miyazaki (JP); Gyokubu Cho, Kanagawa (JP); Koichi Komatsu, Kawasaki (JP); Hidemitsu Asano, Kawasaki (JP); Takashi Hanamura, Hadano (JP); Takuho Maeda, Kawasaki (JP); Isao Tokuhara, Kawasaki (JP)

(73) Assignee: MITUTOYO CORPORATION, Kanagawa (JP)

( * ) Notice: Subject to any disclaimer, the term of this patent is extended or adjusted under 35 U.S.C. 154(b) by 204 days.

(21) Appl. No.: 15/085,027

(22) Filed: Mar. 30, 2016

(65) Prior Publication Data
US 2016/0295207 A1 Oct. 6, 2016

(30) Foreign Application Priority Data
Mar. 31, 2015 (JP) .................... 2015-070758

(51) Int. Cl.
*G06T 1/00* (2006.01)
*G06T 7/00* (2017.01)
*H04N 5/14* (2006.01)
*G01B 11/02* (2006.01)

(52) U.S. Cl.
CPC .......... *G06T 7/0085* (2013.01); *G01B 11/022* (2013.01); *H04N 5/142* (2013.01)

(58) Field of Classification Search
CPC ...... G01B 11/022; G06T 7/0085; H04N 5/142
See application file for complete search history.

(56) References Cited

U.S. PATENT DOCUMENTS

2011/0310256 A1* 12/2011 Shishido ................ G02B 27/32
348/188

FOREIGN PATENT DOCUMENTS

| JP | 2005-004391 A | 1/2005 |
|---|---|---|
| JP | 5412757 B | 2/2010 |

* cited by examiner

*Primary Examiner* — Peter D Le
(74) *Attorney, Agent, or Firm* — Greenblum & Bernstein, P.L.C.

(57) ABSTRACT

A distance in a scanning direction between a first set of edges which face each other and exhibit an opposite change between light and dark is measured by an image measuring machine, and a bias correction value is calculated based on a difference between a measured value and a true value. Using the bias correction value, detection point correction values, which are correction values in various directions of edge detection points detected by a scan of a measured object using the image measuring machine, are calculated; a correction amount used in correction of the edge detection points is specified based on the detection point correction value in each direction; and the edge detection points are corrected using the correction amount.

6 Claims, 10 Drawing Sheets

--PRIOR ART--

--PRIOR ART--

EDGE DETECTION BIAS CORRECTION VALUE CALCULATION METHOD, EDGE DETECTION BIAS CORRECTION METHOD, AND EDGE DETECTION BIAS CORRECTING PROGRAM

CROSS-REFERENCE TO RELATED APPLICATIONS

The present application claims priority under 35 U.S.C. § 119 of Japanese Application No. 2015-070758, filed on Mar. 31, 2015, the disclosure of which is expressly incorporated by reference herein in its entirety.

BACKGROUND OF THE INVENTION

1. Field of the Invention

The present invention relates to an edge detection bias correction value calculation method, an edge detection bias correction method, and a program correcting detection bias that occurs during edge detection on an image measuring machine.

2. Description of Related Art

The image measuring machine uses a CCD camera to capture an image of a work piece (measured object) through a field lens, then performs measurement of a shape, dimensions, or the like of the work piece based on the captured image by detecting edges (boundaries between light and dark) at a plurality of locations. Detection of an edge is typically performed by displaying an edge detection tool showing a detection range superimposed on the image of the work piece captured by an operation by a user. The tool includes various forms matched to the form of the work piece and nature of the measurement. These may include a straight line tool such as that shown in FIG. 11A, a rectangular tool such as that shown in FIG. 11B, and the like. In any case, a tool 22 is displayed on a work piece image 21, and an edge 23 is detected by searching image data in a direction of an arrow symbol. Specifically, a grayscale in the tool is read and a boundary between light and dark is identified by a predetermined algorithm, and the identified boundary between light and dark is detected as the edge.

However, in the image measuring machine, an error such as distortion is included in the image data captured by the CCD camera due to an aberration in a lens or inclination of the camera, and accurate detection of the position of the edge is compromised by the presence of the error. In order to correct such an error, typically a field-of-view correction process is performed on the image data, such as those disclosed in Japanese Patent Laid-open Publication No. 2005-004391 and Japanese Patent No. 5,412,757, for example.

By performing the field-of-view correction process, the error in the image data caused by the lens aberration, camera inclination, or the like is corrected. However, even when the corrected image data is used, a slight error remains in the detected position of the edge, caused by the edge detection algorithm or the like. In addition, a magnitude of the error varies depending on optical settings such as type of illumination, resolution, or type/individual differences of lenses, and on differences in the detected position of the edge within a field-of-view of image acquisition.

SUMMARY OF THE INVENTION

The present invention provides an edge detection bias correction value calculation method which prepares, ahead of time, a bias correction value correcting an edge detection error; an edge detection bias correction method applying the prepared bias correction value to correction of a position of an edge detection point to be corrected; and a program executing these methods.

The edge detection bias correction value calculation method according to the present invention measures a distance in a scanning direction between one set of edges which face each other and exhibit an opposite change between light and dark, and calculates a bias correction value based on a difference between a measured value and a true value. For example, when a scan is performed beginning in a light region of a work piece, the distance between an edge where there is a change from the light region to a dark region and an edge where there is a change from the dark region to a light region is measured by an image measuring machine (also referred to as an image measurer, vision measurer, vision measuring machine, vision measuring device, or image measuring device), and the bias correction value is obtained by finding the difference between this measured value and the true value. Using this method, the bias correction value can be readily obtained.

Due to an edge detection algorithm that is used, in a case where there is a dark region between the edges, the distance between the edges is measured as wider than the true value, whereas in the case of a light region, the distance is measured as narrower than the true value. In such a case, by defining the changes between light and dark at the edge portions as a positive or negative direction ahead of time, a mathematical sign of the bias correction value can be identified by ascertaining whether the bias correction value corrects a width of each region in the same direction or the opposite direction with respect to the defined positive and negative directions. Therefore, using a bias correction value having a mathematical sign identified in this way, correction can be performed in an appropriate direction based on the positive and negative directions defined for the changes between light and dark at the edge portions. For example, when a direction in which the regions at the edge portion change from dark to light is designated the positive direction, the direction in which the width of the widened dark region is narrowed and the direction in which the narrowed light region widens are both the negative direction, and therefore the bias correction value is a negative value for both. In contrast, when the direction in which the regions at the edge portion change from light to dark is designated the positive direction, the bias correction value is a positive value for both. In other words, the mathematical sign of the bias correction value is the same regardless of whether there is a dark region or a light region between the edges. Therefore, when the difference between the measured value and the true value is found in order to calculate the bias correction value, an equation is simply set such that the mathematical sign of the bias correction value is the same in cases where there is a dark region between the edges and in cases where there is a light region between the edges.

A configuration is also possible which includes an additional set of edges which face each other, provided in a direction orthogonal to the first set, and which calculates the bias correction value for each direction. Accordingly, appropriate correction can be performed even in a case where a difference arises in the bias correction values between each of the mutually orthogonal directions.

Using a calibration chart having a checkerboard pattern in which a plurality of rectangles of two tones (light and dark) are arranged so as to alternate vertically and horizontally, which corresponds to a field-of-view of image acquisition of the image measuring machine, each of the edge portions are scanned by the image measuring machine. Accordingly, for each rectangle, the distance between edges which face each other and which are included in the rectangle may each be measured in each of the mutually orthogonal directions and the bias correction value in each direction may be calculated. In this example, "rectangle" refers to quadrangles in which the four corners form right angles, and includes a square. Accordingly, the bias correction value in each mutually orthogonal direction can be obtained for each rectangular region in the field-of-view of image acquisition, and therefore even when a degree of error differs due to the measurement position, bias correction can be performed with a high degree of accuracy across the entire field-of-view of image acquisition.

The error in the edge detection position which occurs in the image measuring machine varies depending on the optical settings such as type of illumination used, resolution, or type/individual differences of lenses. Therefore, measurement of the distance between edges and calculation/collection of bias correction values based on that distance may be performed for each optical setting of the image measuring machine. Accordingly, bias correction can be performed with a high degree of accuracy under various measurement conditions.

The edge detection bias correction method according to the present invention executes detection point correction value calculation, in which detection point correction values, which are correction values for the edge detection points detected by a scan of the measured object using the image measuring machine, are calculated in each mutually orthogonal direction using bias correction values obtained ahead of time by measurement using the image measuring machine; correction amount specification specifying a correction amount of the edge detection points based on the detection point correction value in each direction; and detection point correction correcting the edge detection points using the specified correction amount.

In the detection point correction value calculation, using the calibration chart having a checkerboard pattern in which a plurality of rectangles of two tones (light and dark) are arranged so as to alternate vertically and horizontally, which corresponds to the field-of-view of image acquisition of the image measuring machine, each of the edge portions are scanned by the image measuring machine and the distance between facing edges which are included in the rectangles is respectively measured in each of the orthogonal directions, and thereby, the bias correction value in each direction is calculated ahead of time. These pre-calculated bias correction values are stored, for each of the plurality of rectangles, in a correction value table, which is referenced and the bias correction values of the at least one rectangle proximate to the edge detection point are respectively inserted for each of the directions, and accordingly the detection point correction value for each direction of the edge detection point may be calculated. In this way, by using the bias correction value for each mutually orthogonal direction calculated for each rectangular region within the field-of-view of image acquisition, and calculating the detection point correction value for each direction of the edge detection point by inserting the bias correction value of the at least one rectangle proximate to the edge detection point for each direction, regardless of the position of the edge detection point within the field-of-view of image acquisition, and regardless of the position to which the edge detection point is shifted from each point representing each of the rectangles for which a bias correction value is recorded in the correction value table, an appropriate detection point correction value can be obtained, and thus bias correction can be performed with a high degree of accuracy across the entire field-of-view of image acquisition. Moreover, by using a configuration which prepares the correction value table for each optical setting of the image measuring machine and which references the correction value table corresponding to the optical settings when executing the edge detection bias correction, bias correction can be performed with a high degree of accuracy under various measurement conditions.

In the correction amount specification, in response to a scan-direction slope when detecting the edge detection point, relative to the direction of the scan during a measurement in which the bias correction values are obtained, any one of the detection point correction values for each direction may be specified as the correction amount. Specifically, in an example where the directions of the scan during a measurement in which the bias correction value is obtained are respectively designated as an X direction and a Y direction, when a scan-direction slope during detection of the edge detection point is within ±45° relative to the X direction, an X-direction detection point correction value is specified as the correction amount, and when the scan-direction slope is between ±45° and 90°, a Y-direction detection point correction value is specified as the correction amount. By specifying the detection point correction value in the direction closest to the direction in which the scan slopes during detection of the edge detection point as the correction amount in this way, an appropriate correction amount can be reflected in the bias correction.

In the correction amount specification, in response to the scan-direction slope when detecting the edge detection point, relative to the direction of the scan during the measurement in which the bias correction values are obtained, a value calculated by proportionally distributing the detection point correction values for each direction may be specified as the correction amount. By specifying the value in which the detection point correction value for each direction is proportionally distributed in accordance with the slope in the scan direction as the correction amount in this way, a more appropriate correction amount can be reflected in the bias correction.

In the detection point correction, by adding or subtracting the correction amount specified in the correction amount specification to the coordinates of the edge detection point, in consideration of the scan-direction slope when detecting the edge detection point, relative to the direction of the scan during a measurement in which the bias correction values are obtained, the edge detection point may be corrected. Accordingly, even when the scan direction when detecting the edge detection point slopes relative to the direction of the scan during the measurement in which the bias correction values are obtained, by taking the slope into consideration and reflecting the correction amount in the correction of each coordinate of the edge detection point, the bias correction can be performed appropriately. Specifically, for example, in a case where the coordinates of the edge detection point are designated (X, Y), the correction amount when the direction in which there is a change from dark to light at the edge portion is defined as a positive direction is designated dL, and the slope in the scan direction relative to the X axis direction while detecting the edge detection point is designated θ, when a direction of change between light and dark at the edge portion in the scan direction while detecting the edge detection point is a direction from dark to light, coordinates $(T_x, T_y)$ after correction are found by:

$T_x = X + dL \cdot \cos\theta$ $T_y = Y + dL \cdot \sin\theta$ and when the direction of the change between light and dark is from light to dark:

$T_x = X - dL \cdot \cos\theta$ $T_y = Y - dL \cdot \sin\theta$

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

In the present invention, prior to measuring a measured object with an image measuring machine, an edge detection bias correction value calculation method described hereafter is used to ascertain, as a bias correction value, an edge position bias detected by the image measuring machine using a calibration chart or the like, after which an edge detection bias correction method described below is used to correct a measured edge position for the measured object based on the bias correction value obtained beforehand.

Figure 1:
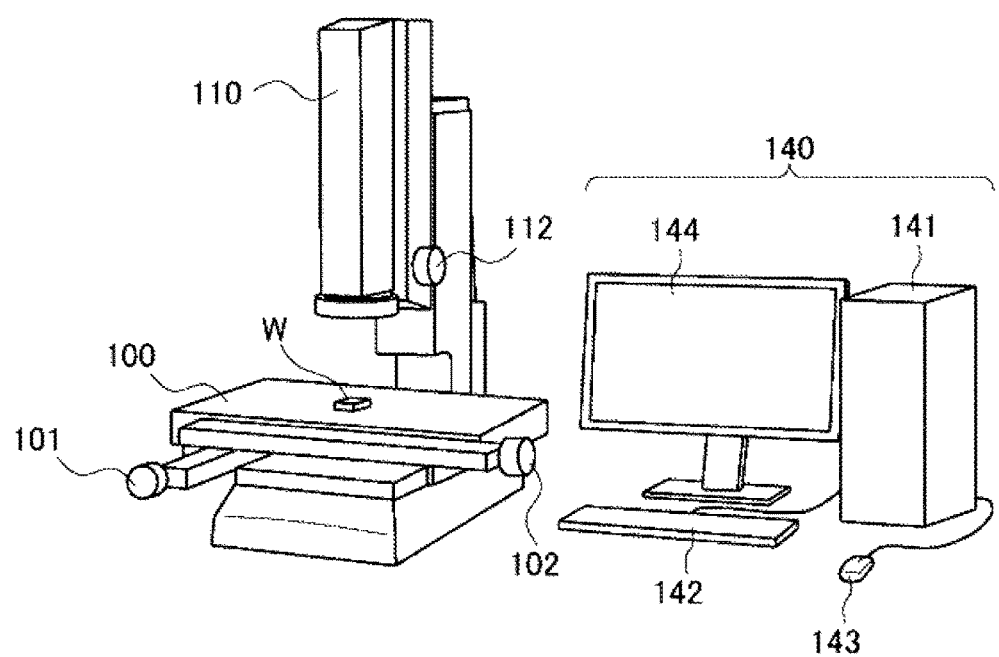
FIG. 1 illustrates an exemplary image measuring machine on which methods according to the present invention are executed.

FIG. 1 illustrates an exemplary image measuring machine on which are executed the edge detection bias correction value calculation method and the edge detection bias correction method according to the present invention. An image measurement apparatus 1 includes a stage 100, a casing 110, and a computer system 140. The stage 100 is arranged such that a top surface of the stage 100 aligns with a horizontal plane, and a work piece (measured object) W is placed on this top surface. The stage 100 is capable of displacement in an X axis direction and a Y axis direction by rotation operation of handles 101 and 102. The casing 110 encloses an optical system 120 and an image capture element 130, the optical system 120 including an illumination device such as a transillumination device or an epi-illumination device. The casing 110 is also capable of displacement, together with the optical system 120 and the image capture element 130, in a Z axis direction by rotation operation of a handle 112. The computer system 140 includes a computer main body 141, a keyboard 142, a mouse 143, and a display 144, for example. The edge detection bias correction value calculation method and edge detection bias correction method according to the present invention are, for example, written as programs that can be executed by computer and are executed on the computer system 140.

Edge Detection Bias Correction Value Calculation Method

The edge detection bias correction value calculation method according to the present invention obtains a bias correction value by using an image measuring machine to measure a distance in a scanning direction between one set of edges which face each other and exhibit an opposite change between light and dark, and finding a difference between a measured value and a true value. In this example, "true value" refers to a measured value obtained using a contact-type measurement tool such as a micrometer, to dimensions of various rectangles configuring a calibration chart in which dimensions are accurately represented, or the like.

Figure 2A:
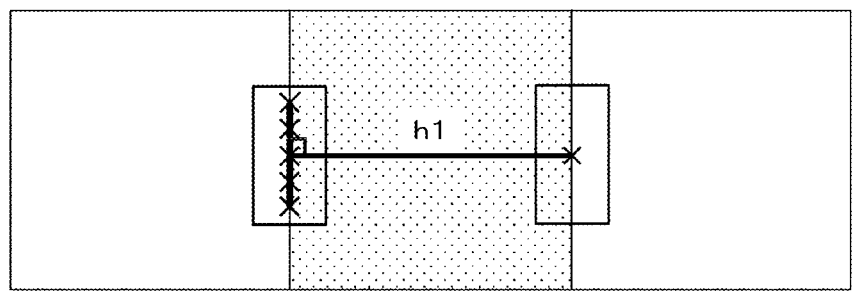
FIGS. 2A and 2B illustrate a method of measuring a distance between edges.
Figure 2B:
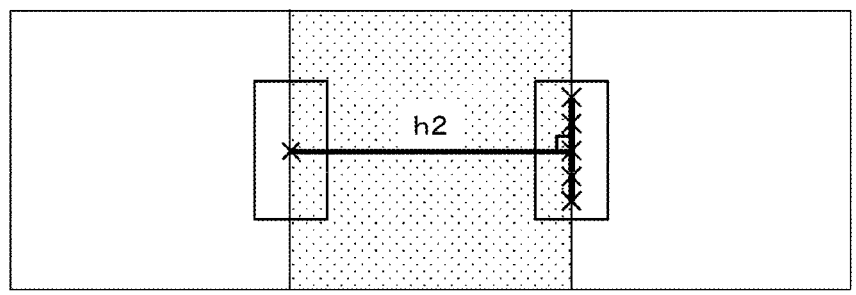

An exemplary method of measuring a distance between edges is described with reference to FIGS. 2A and 2B. The distance between edges is fundamentally a distance between two lines. However, in a case where the edges are not parallel, no perpendicular line exists which can be drawn between the two lines, and so the distance cannot be measured. Given this, a distance between a line and a point is measured. Specifically, with reference first to FIG. 2A, a plurality of edge points are detected within a tool for a first, edge, then a straight line mock-linking the detected points is derived using the least squares method, for example. A line perpendicular to this line is drawn from, for example, a mid-point within the tool of a second edge, and a length h1 of the perpendicular line is calculated. Next, with reference to FIG. 2B, a relationship between the line and the points is reversed and a length h2 of a perpendicular line is calculated using a similar method, and an average of h1 and h2 is found. This is treated as the distance between the edges. This is because, in a case where the distance is found for only one edge, when the straight line mock-linking the plurality of edge detection points is sloped, the calculation lacks accuracy as a measured value of width.

A method of calculating the bias correction value is described with reference to a chart shown in FIG. 3, in which light and dark areas alternate with edges as boundaries. In a case where scanning is performed from left to right over the drawing sheet, there is a change at an edge 11 from a light region to a dark region, and at an edge 12, which faces the edge 11, there is an opposite change from a dark region to a light region. The distance between this set of edges is measured using an image measuring machine, the difference between the measured value and the true value is found, and the value obtained is designated as the bias correction value representing the dark region between the edge 11 and the edge 12. In addition, at an edge 13, which faces the edge 12, there is another opposite change from a light region to a dark region. The distance between this set of edges is measured using the image measuring machine, the difference between the measured value and the true value is found, and the value obtained is designated as the bias correction value representing the light region between the edge 12 and the edge 13.

Figure 3:
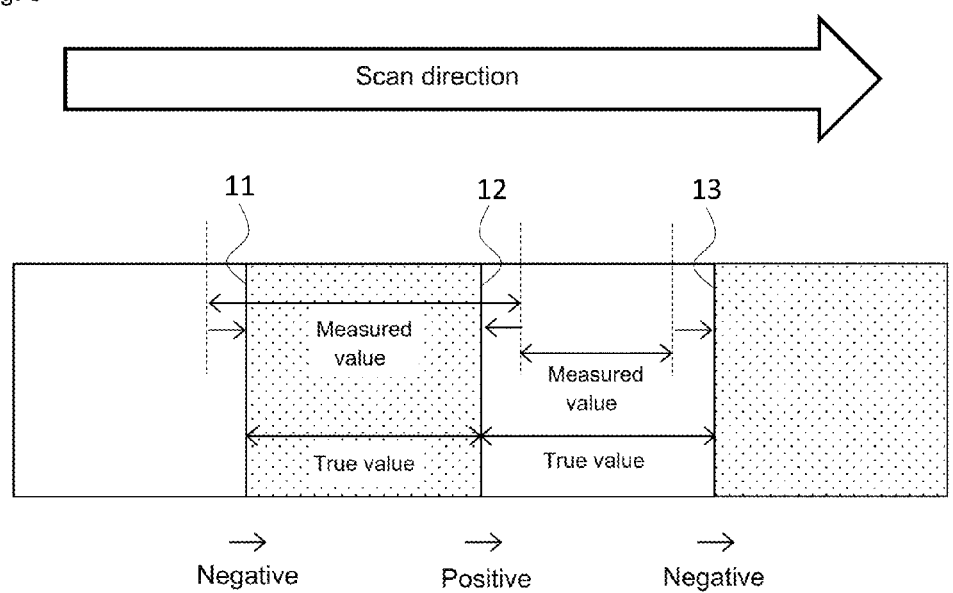
FIG. 3 illustrates a bias correction value calculation method, as well as a mathematical sign of the bias correction value.

In the example shown in FIG. 3, in a case where there is a dark region between the edges, the distance between the edges is measured as wider than the true value, whereas in the case of a light region, the distance is measured as narrower than the true value. This phenomenon is caused primarily by an edge detection algorithm of the image measuring machine. In such cases, when a difference is found by subtracting the true value from the measured value to calculate the bias correction value, for example, the value is positive in cases where there is a dark region between the edges and is negative in cases where there is a light region. The mathematical sign of the bias correction value differing in this way is appropriate from the viewpoint of simply correcting the distance between the edges. However, it is the position of the edges delineating the light and dark regions which is to be corrected according to the present invention. Increasing or decreasing the distance between the edges is merely coincident with correcting the position of the edges on both sides of the light or dark region. When the position of the edges is treated as the value to be corrected, the changes between light and dark at the edge portions are defined as a positive or negative direction ahead of time. Accordingly, the mathematical sign of the bias correction value can be identified by ascertaining whether the bias correction value corrects the edge position in the same direction or the opposite direction with respect to the defined positive and negative directions. Therefore, using a bias correction value having a mathematical sign identified in this way, correction can be performed in an appropriate direction based on the positive and negative directions defined for the changes between light and dark at the edge portions. For example, when a direction in which the regions at the edge portion change from dark to light is designated the positive direction, the direction in which the width of the widened dark region is narrowed and the direction in which the narrowed light region widens are both the negative direction, and therefore the bias correction value is a negative value for both. In contrast, when the direction in which the regions at the edge portion change from light to dark is designated the positive direction, the bias correction value is a positive value for both. In other words, the mathematical sign of the bias correction value is the same regardless of whether there is a dark region or a light region between the edges. Therefore, when the difference between the measured value and the true value is found in order to calculate the bias correction value, an equation is simply set such that the mathematical sign of the bias correction value is the same in cases where there is a dark region between the edges and in cases where there is a light region between the edges. Widening of the dark region and narrowing of the light region arises due to offset of the edges on both sides of the region. Therefore, the bias correction value for each edge is ½ of the difference between the measured value and the true value. Therefore, for example, when a direction in which the regions at the edge portion change from dark to light is designated the positive direction, the bias correction value of the dark region is a negative value because that is the direction in which the width of the widened dark region narrows (i.e., the direction changing from light to dark), and therefore the bias correction value of the dark region is found by (true value−measured value)/2. In addition, the bias correction value of the light region is, similarly, a negative value because that is the direction in which the width of the narrowed light region widens (i.e., the direction changing from light to dark), and therefore the bias correction value of the light region is found by (measured value−true value)/2.

Figure 4:
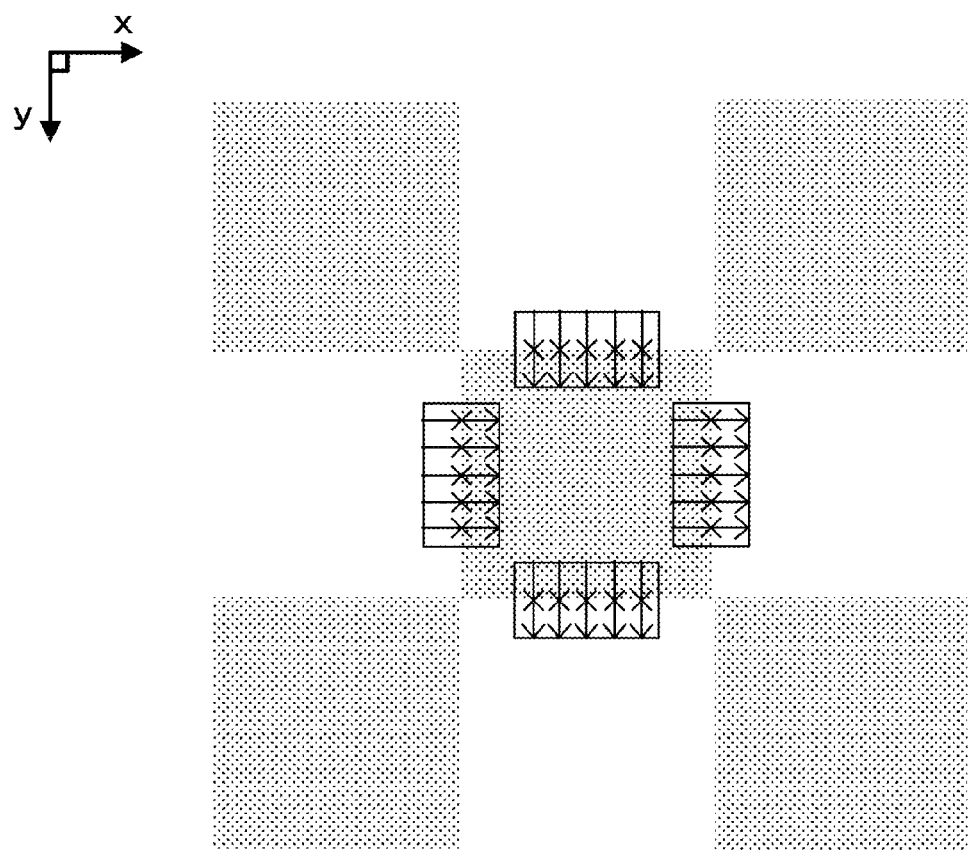
FIG. 4 illustrates an exemplary positional relationship of two mutually orthogonal groups of edges.

Accuracy of the correction can be increased by measuring the distance between the edges and calculating the bias correction value not only for one set of edges, but also for a set of edges mutually orthogonal to the first set, as shown in FIG. 4.

Figure 5:
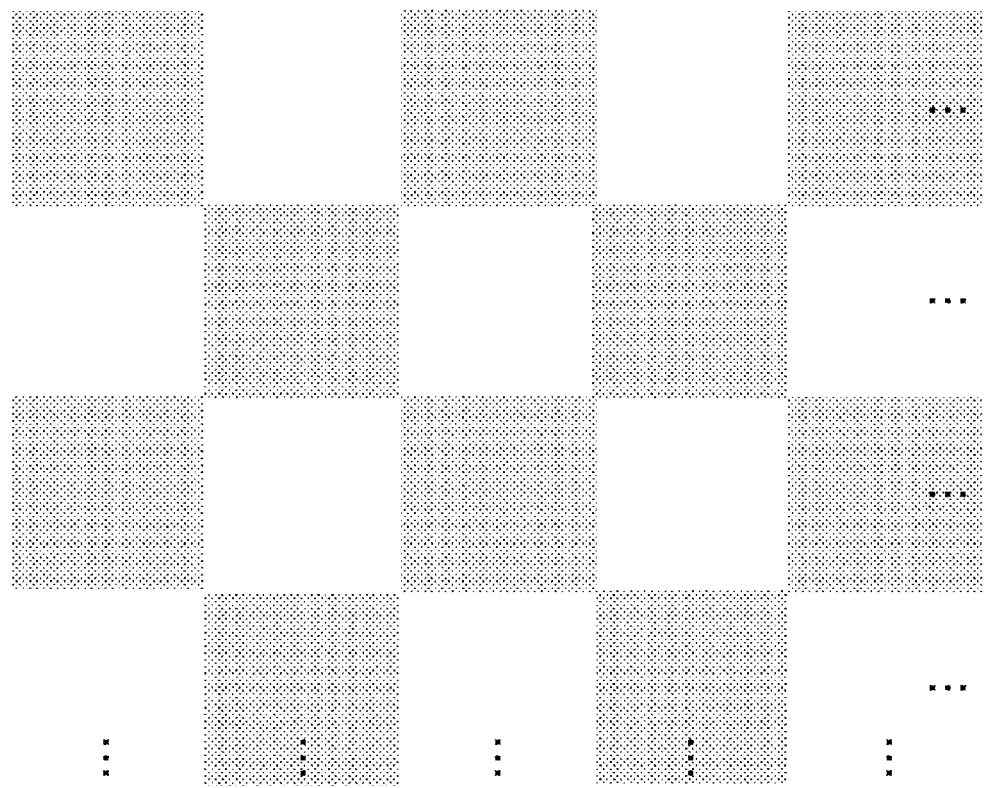
FIG. 5 illustrates an exemplary calibration chart.

An error in the edge detection position which occurs in the image measuring machine differs depending on where in a field-of-view of image acquisition of the image measuring machine the edge to be detected is positioned. Therefore, preferably, the field-of-view of image acquisition is subdivided as much as possible and a bias correction value is prepared for each subdivided region. Given this, using a calibration chart having a checkerboard pattern in which a plurality of rectangles of two tones (light and dark) are arranged so as to alternate vertically and horizontally, as shown in FIG. 5, which corresponds to the field-of-view of image acquisition of the image measuring machine, each of the edge portions are scanned by the image measuring machine. Accordingly, for each rectangle, the distance between edges which face each other and which are included in the rectangle may each be measured in each of the mutually orthogonal directions and the bias correction value in each direction may be calculated. The calibration chart is preferably capable of implementation regardless of whether the illumination device is a transillumination or epi-illumination device, for example, and preferably is printed on a transparent glass plate with a pattern in a non-transparent material. The rectangles configuring the checkerboard pattern refer to quadrangles in which the four corners form right angles; however, with a view toward calibration workability, a square is typically used. In addition, the bias correction value in each direction for each rectangle, which is obtained as a calculation result, is used during bias correction, and therefore is stored, for example, in a correction value table together with position information regarding where in the field-of-view of image acquisition the rectangle is positioned. The position recorded as position information for each rectangle may be any position within each rectangle, but because the position is a value representing the rectangle, the position is preferably an intersection point of diagonal lines or the like designated as a center of the rectangle, for example. Accordingly, the bias correction value in each direction can be obtained for each rectangle in the field-of-view of image acquisition, and therefore even when a degree of error differs due to the measurement position, bias correction can be performed with a high degree of accuracy across the entire field-of-view of image acquisition.

In addition, the error in the edge detection position which occurs in the image measuring machine differs depending on optical settings such as type of illumination to be employed (for example, transillumination or epi-illumination), resolution mode (for example, normal mode or high resolution mode), type/individual differences of a lens, and the like. Therefore, by measuring the distance between edges and calculating/collecting bias correction values based on that distance for each optical setting of the image measuring machine, bias correction can be performed with a high degree of accuracy under various measurement conditions.

Edge Detection Bias Correction Method

Figure 6:
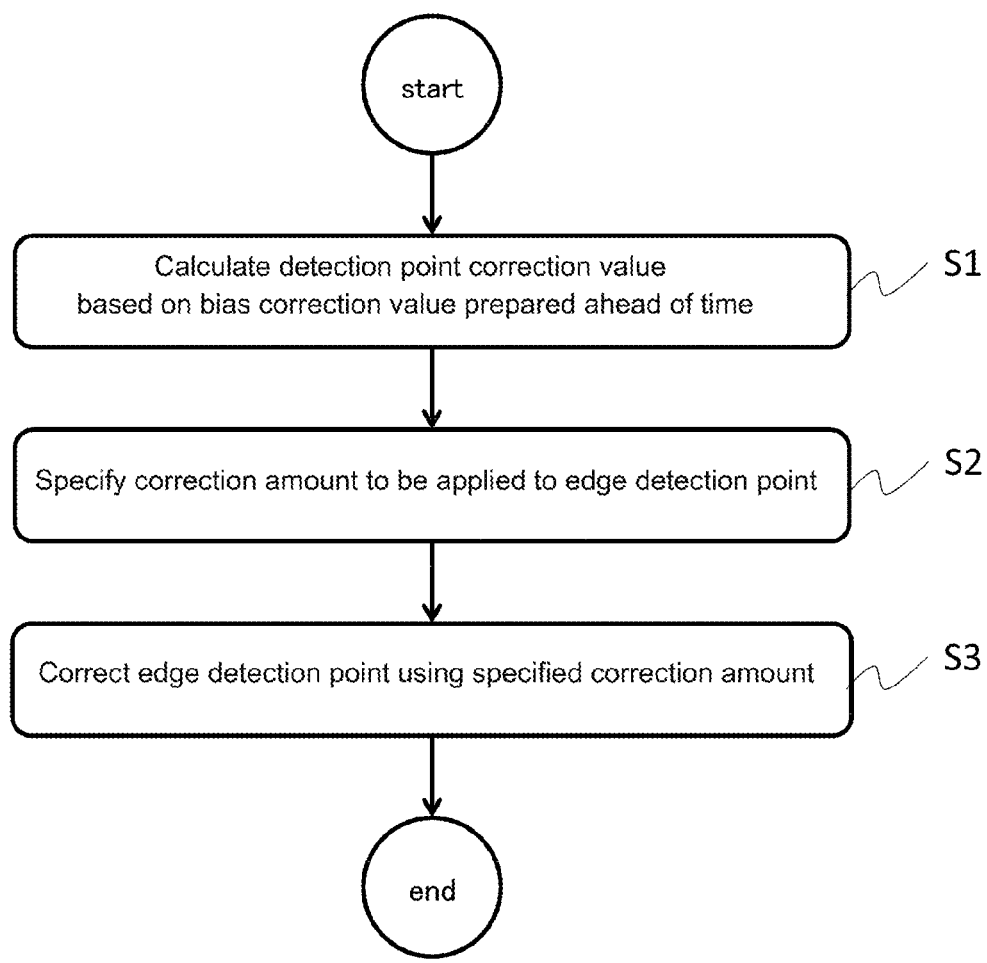
FIG. 6 illustrates a procedural flow of an edge detection bias correction method according to the present invention.

FIG. 6 illustrates a procedural flow of the edge detection bias correction method according to the present invention. The edge detection bias correction method according to the present invention executes detection point correction value calculation (S1), in which detection point correction values in each mutually orthogonal direction, which are correction values for the edge detection points detected by a scan of the edge portions of the measured object using the image measuring machine, are calculated using bias correction values obtained ahead of time by measurement using the image measuring machine; correction amount specification (S2) specifying a correction amount using correction of the edge detection points, based on the detection point correction value in each direction; and detection point correction (S3) correcting the edge detection points using the specified correction amount.

Figure 7:
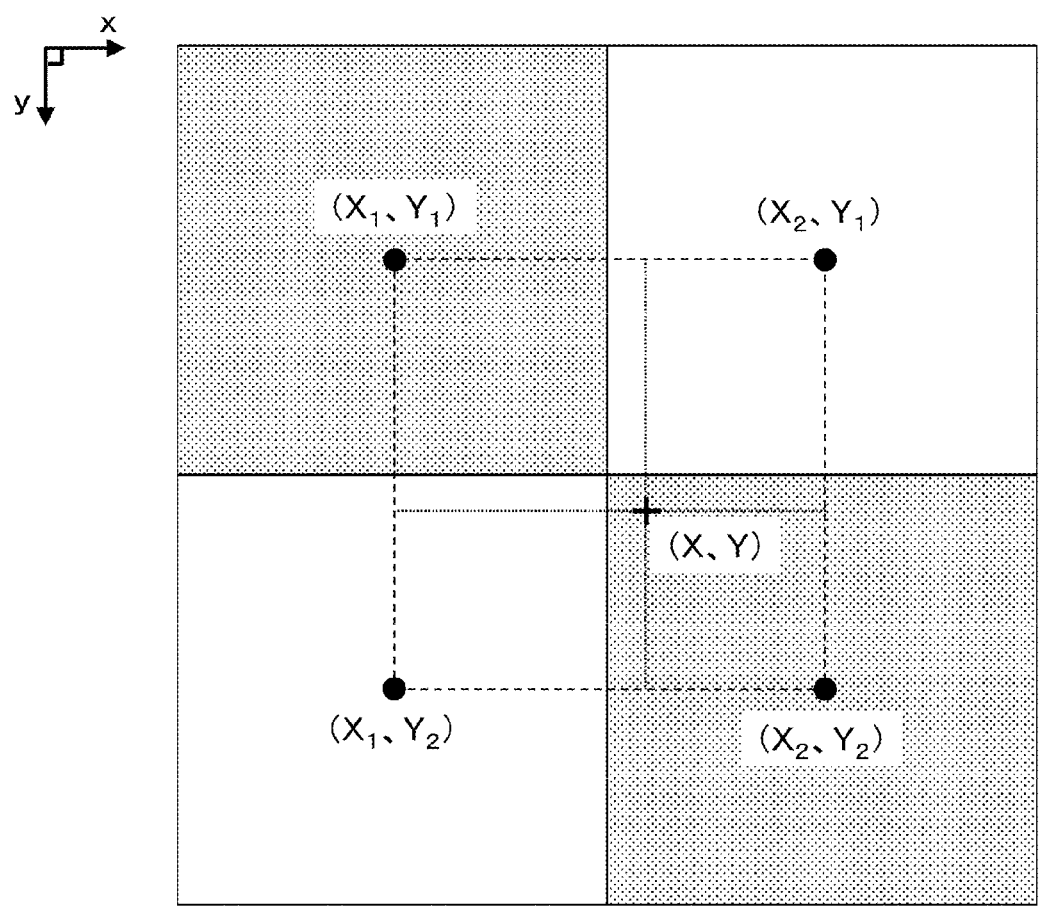
FIG. 7 illustrates a method of calculating a detection point correction value.

In the detection point correction value calculation (S1), using the calibration chart having a checkerboard pattern in which a plurality of rectangles of two tones (light and dark) are arranged so as to alternate vertically and horizontally, which corresponds to the field-of-view of image acquisition of the image measuring machine, each of the edge portions are scanned by the image measuring machine and the distance between facing edges which are included in the rectangles is respectively measured in each of the orthogonal directions, and thereby, the bias correction value in each direction is calculated ahead of time. These pre-calculated bias correction values are stored, for each of the plurality of rectangles, in the correction value table, which is referenced and the bias correction values of the at least one rectangle proximate to the edge detection point are respectively inserted for each of the directions, and accordingly the detection point correction value for each direction of the edge detection point may be calculated. The calculation method is described with reference to FIG. 7. In this example, the bias correction value in each direction for each rectangle is stored in the correction value table together with the position information regarding where in the field-of-view of image acquisition the rectangle is positioned. The position stored as the position information of each rectangle is rendered as coordinates for the center of each rectangle. Any method of insertion may be used. For example, when position coordinates of the edge detection point prior to correction are (X, Y), and the position coordinates having a bias correction value registered for each of four rectangles proximate to the edge detection point are $(X_1, Y_1)$, $(X_2, Y_1)$, $(X_1, Y_2)$, and $(X_2, Y_2)$, respectively, by performing linear interpolation on the X- and Y-direction bias correction values $(d_{x1}, d_{y1})$, $(d_{x2}, d_{y1})$, $(d_{x1}, d_{y2})$, and $(d_{x2}, d_{y2})$ registered for each of the four points, weighted for proximity to (X, Y), the detection point correction value (dx, dy) is obtained. In this way, by using the bias correction value for each direction calculated ahead of time for each rectangular region within the field-of-view of image acquisition, and calculating the detection point correction value for each direction of the edge detection point by inserting the bias correction value of the at least one rectangle proximate to the edge detection point, regardless of the position of the edge detection point within the field-of-view of image acquisition, and regardless of the position to which the edge detection point is shifted from each point representing each of the rectangles for which a bias correction value is recorded in the correction value table, an appropriate detection point correction value can be obtained, and thus bias correction can be performed with a high degree of accuracy across the entire field-of-view of image acquisition. Moreover, by using a configuration which prepares the correction value table for each optical setting of the image measuring machine and which references the correction value table corresponding to the optical settings when executing the edge detection bias correction, bias correction can be performed with a high degree of accuracy under various measurement conditions.

Figure 8:
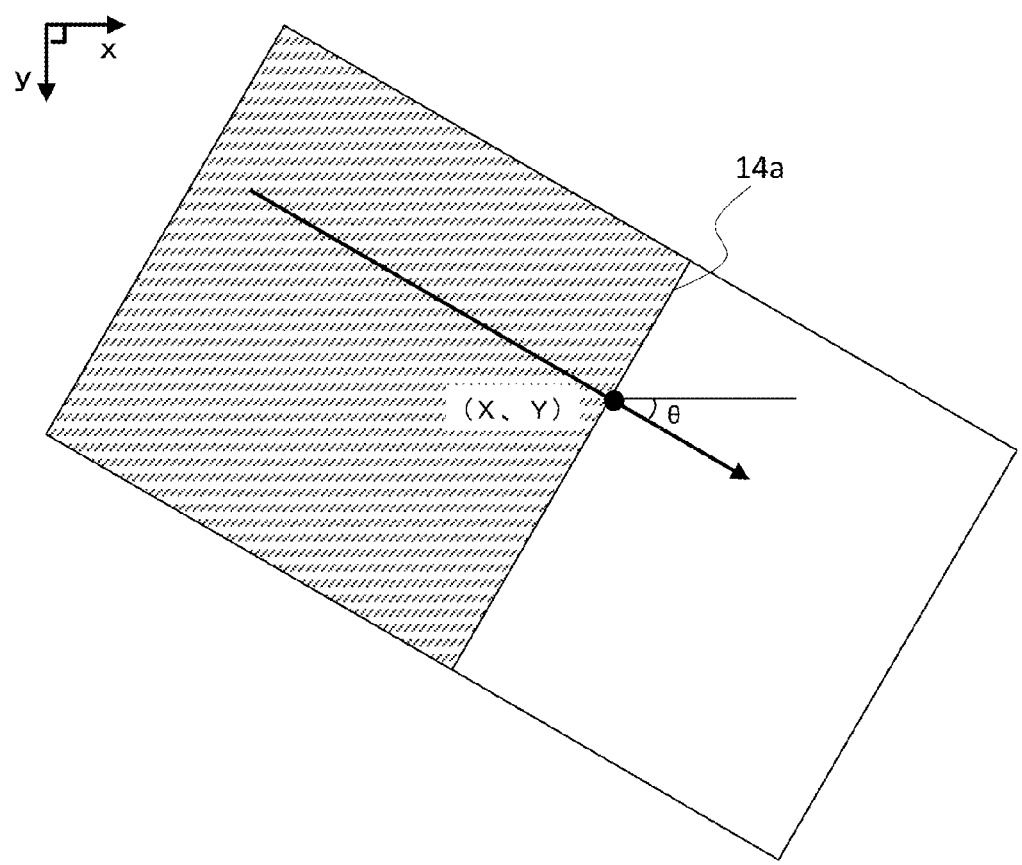
FIG. 8 illustrates a method of specifying an amount of correction.

In the correction amount specification (S2), in response to a scan-direction slope when detecting the edge detection point, relative to the direction of the scan during a measurement in which the bias correction values are obtained, any one of the detection point correction values for each direction may be specified as the correction amount. The specification method is described with reference to FIG. 8. For example, the coordinates of the edge detection point are (X, Y) on an edge 14a prior to correction, and the X-direction detection point correction value is designated dx, while the Y-direction detection point correction value orthogonal to dx is designated dy. The direction of the scan during the measurement in which the bias correction values are obtained may be selected from the X direction during the measurement in which dx is obtained and the Y direction during the measurement in which dy is obtained. In this example, the X direction is treated as the scan direction. At this point, when the slope of the scan direction relative to the X direction during detection of the edge detection point is designated θ, when θ is between −45° and +45°, dx is applied as a correction amount dL, whereas when θ is between +45° and +90° or between −45° and −90°, dy is applied as the correction amount dL. By specifying the detection point correction value in the direction closest to the direction in which the scan slopes during detection of the edge detection point as the correction amount in this way, an appropriate correction amount can be reflected in the bias correction.

Figure 9:
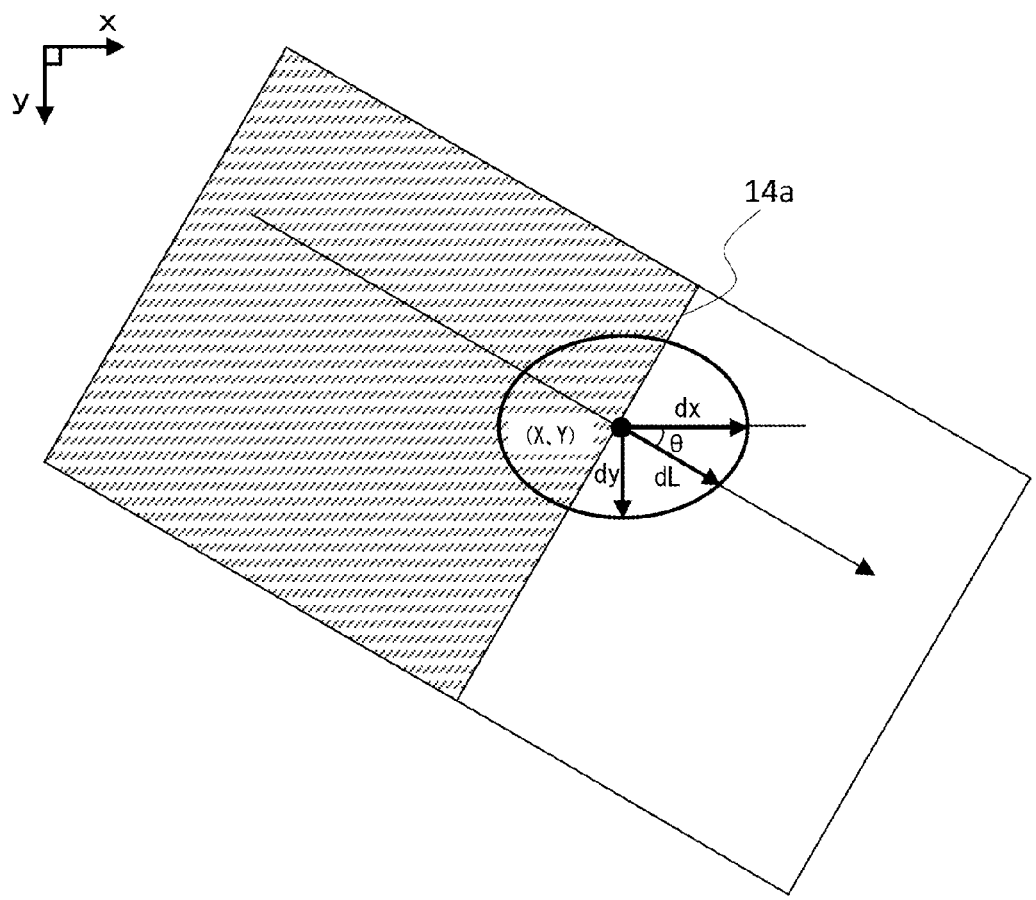
FIG. 9 illustrates another method of specifying the amount of correction.

In addition, in the correction amount specification (S2), in response to the scan-direction slope when detecting the edge detection point, relative to the direction of the scan during the measurement in which the bias correction values are obtained, a value calculated by proportionally distributing the detection point correction values for each direction may be specified as the correction amount. The specification method is described with reference to FIG. 9. For example, the coordinates of the edge detection point are (X, Y) on the edge 14a prior to correction, and the X-direction detection point correction value is designated dx, while the Y-direction detection point correction value orthogonal to dx is designated dy. The direction of the scan during the measurement in which the bias correction values are obtained may be selected from the X direction during the measurement in which dx is obtained and the Y direction during the measurement in which dy is obtained. In this example, the X direction is treated as the scan direction. At this point, the slope of the scan direction relative to the X direction during detection of the edge detection point is designated θ, and the correction amount dL is defined as an elliptical locus drawn centered on the coordinates (X, Y) of the edge detection point prior to correction, and such that when θ=0°, dL is dx and when θ=±90°, dL is ±dy. Accordingly, the value of dx and dy is proportionally distributed to dL in accordance with the slope θ. Specifically, $$dL = dx \cdot dy / \sqrt{\{(dy \cdot \cos\theta)^2 + (dx \cdot \sin\theta)^2\}}$$

can be used to define the correction amount dL. By specifying the value in which the detection point correction value for each direction is proportionally distributed in accordance with the slope in the scan direction as the correction amount in this way, a more appropriate correction amount can be reflected in the bias correction.

Figure 10:
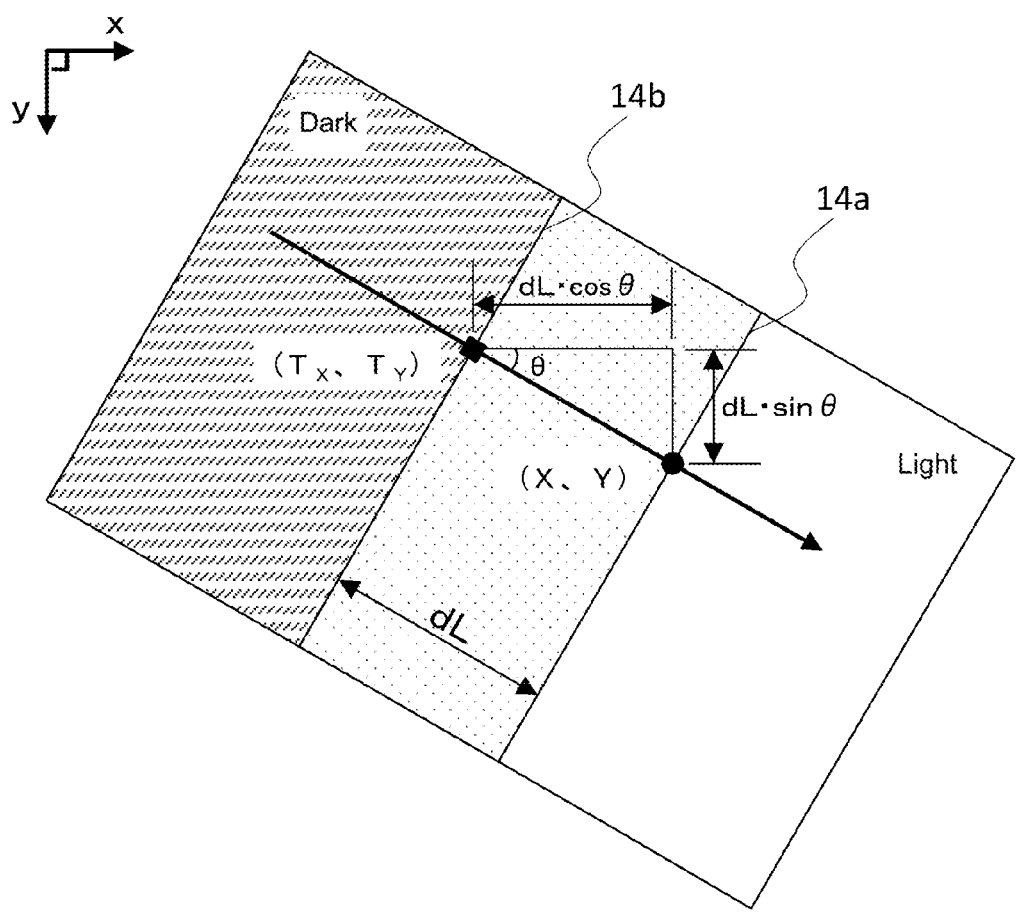
FIG. 10 illustrates a method of correcting edge detection points.
Figure 11A:
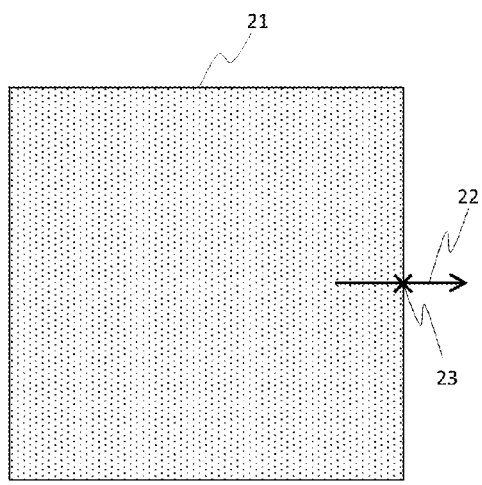
FIGS. 11A and 11B illustrate a relationship between a work piece image, a tool, and an edge.
Figure 11B:
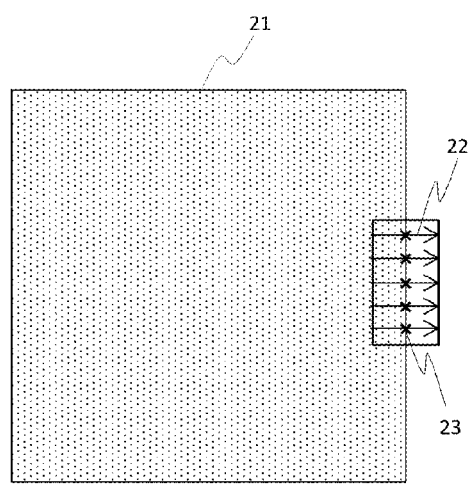

In the detection point correction (S3), by adding or subtracting the correction amount specified in the correction amount specification (S2) to the coordinates of the edge detection point, in consideration of the scan-direction slope when detecting the edge detection point, relative to the direction of the scan during a measurement in which the bias correction values are obtained, the edge detection point may be corrected. Accordingly, even when the scan direction when detecting the edge detection point slopes relative to the direction of the scan during the measurement in which the bias correction values are obtained, by taking the slope into consideration and reflecting the correction amount in the correction of each coordinate of the edge detection point, the bias correction can be performed appropriately. The correction method is described with reference to FIG. 10. For example, in a case where the coordinates of the edge detection point on the edge 14a prior to correction are designated (X, Y), the correction amount when the direction in which there is a change from dark to light at the edge portion is defined as a positive direction is designated dL, and the slope in the scan direction relative to the X axis direction while detecting the edge detection point is designated θ, when a direction of change between light and dark at the edge portion in the scan direction while detecting the edge detection point is a direction from dark to light (the case shown in FIG. 10), the coordinates $(T_x, T_y)$ on an edge 14b after correction are found by:

$$T_x = X + dL \cdot \cos\theta$$

$$T_y = Y + dL \cdot \sin\theta$$

and when the direction of the change between light and dark is from light to dark:

$$T_x = X - dL \cdot \cos\theta$$

$$T_y = Y - dL \cdot \sin\theta$$

Field-of-view correction which has been used conventionally and the edge detection bias correction according to the present invention are each performed with different objectives, and therefore there is an option to employ both or to employ only one of the two. In a case where both are employed, the field-of-view correction and the edge detection bias correction may be performed in any order.

The various processes of the edge detection bias correction value calculation method and the edge detection bias correction method according to the present invention may be combined or separated as necessary. In addition, the present invention may be modified as needed within the scope of the technical ideas reflected in the invention. Embodiments featuring such modifications or improvements are within the technical scope of the present invention.

In a case where the edge detection bias correction value calculation method and edge detection bias correction method according to the present invention are run on a computer, the various processes configuring the methods are written by a program. The program may, for example, be stored on a hard disk device and, when run, the necessary program and data may be read to a RAM (Random Access Memory) and the program executed by a CPU, thereby enabling the various processes on the computer.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. An edge detection bias correction value calculation method for correcting a bias in an image measuring apparatus including an image measuring device and a computer, the method comprising:
   performing, using the computer, image processing of an image of an object;
   measuring, by the image measuring device and using the image processed by the computer, a distance in a scanning direction between a first set of edges of a pattern image, the pattern image including a light area and a dark area, edges included in the first set of edges face each other and are located at a boundary between the light area and the dark area; and
   calculating, by the computer, a bias correction value, which is a difference value between a measured value and an actual value that is predetermined prior to measurement, wherein when the distance between the first set of edges is larger than the actual value, determining that the dark area is included between the first set of edges, and
   when the distance between the first set of edges is smaller than the actual value, determining that the light area is included between the first set of edges.

2. The edge detection bias correction value calculation method according to claim 1, further comprising specifying, whether the bias correction value is positive or negative, wherein the bias correction value in a positive direction or a negative direction is determined ahead of time for changes between the light area and the dark area at edge portions.

3. The edge detection bias correction value calculation method according to claim 1, further comprising providing a second set of edges in a direction orthogonal to the first set of edges, wherein the calculating the bias correction further comprises calculating a bias correction for each direction.

4. The edge detection bias correction value calculation method according to claim 3, further comprising: using a calibration chart having a checkerboard pattern in which a plurality of rectangles of two tones are arranged so as to alternate vertically and horizontally, which corresponds to a field-of-view of image acquisition of the image measuring device, scanning each of the edge portions by the image measuring device, wherein for each rectangle, the distance between edges which face each other and which are included in the rectangle are each measured in each of the mutually orthogonal directions and the bias correction value in each direction is calculated, and the two tones include a light tone and a dark tone.

5. The edge detection bias correction value calculation method according to claim 1, further comprising performing, for each optical setting of the image measurer, the measuring and the calculating.

6. A non-transitory computer-readable storage medium that stores a program for executing an edge detection bias correction value calculation method for correcting a bias in an image measuring device, the program causing the computer to execute a process comprising: performing, using the computer, image processing of an image; measuring, by an image measuring device and using the image processed by the computer, a distance in a scanning direction between a first set of edges of a pattern image, the pattern image including a light area and a dark area, edges included in the first set of edges face each other and are located at a boundary between the light area and the dark area; and calculating, by the computer, a bias correction value, which is a difference value between a measured value and an actual value that is predetermined prior to measurement, wherein when the distance between the first set of edges is larger than the actual value, determining that the dark area is included between the first set of edges, and when the distance between the first set of edges is smaller than the actual value, determining that the light area is included between the first set of edges.

* * * * *